(12) United States Patent
Herrmann

(10) Patent No.: US 11,385,852 B2
(45) Date of Patent: Jul. 12, 2022

(54) SPHERICAL ILLUMINANT AND DISPLAY DEVICE

(71) Applicant: MOTHERSON INNOVATIONS COMPANY LIMITED, London (GB)

(72) Inventor: Andreas Herrmann, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 126 days.

(21) Appl. No.: 16/817,914

(22) Filed: Mar. 13, 2020

(65) Prior Publication Data

US 2020/0218489 A1   Jul. 9, 2020

Related U.S. Application Data

(63) Continuation of application No. PCT/EP2018/074660, filed on Sep. 12, 2018.

(30) Foreign Application Priority Data

Sep. 14, 2017 (DE) .......................... 102017121386.4

(51) Int. Cl.
*G06F 3/14* (2006.01)
*G06F 3/01* (2006.01)

(52) U.S. Cl.
CPC ............ *G06F 3/1423* (2013.01); *G06F 3/011* (2013.01)

(58) Field of Classification Search
None
See application file for complete search history.

(56) References Cited

U.S. PATENT DOCUMENTS

2016/0267848 A1* 9/2016 Mowry .................. G09G 3/342
2017/0105465 A1* 4/2017 Kuddo ....................... G09F 9/35
2017/0192733 A1* 7/2017 Huang ................... G06F 3/1446

FOREIGN PATENT DOCUMENTS

WO    WO 2011/077740 A1    6/2011

OTHER PUBLICATIONS

International Search Report dated Dec. 10, 2018 of International application No. PCT/EP2018/074860.
Written Opinion dated Dec. 10, 2018 of International application No. PCT/EP2018/074860.
International Preliminary Report on Patentability dated Nov. 29, 2019 of International application No. PCT/EP2018/074860.

* cited by examiner

*Primary Examiner* — Andre L Matthews
(74) *Attorney, Agent, or Firm* — Jones Day

(57) ABSTRACT

A display device includes a plurality of moveable display units, and at least one external control device for emitting control signals in dependence on which at least some of the plurality of display units form a display, the display units each being connected at different locations via coupling means and capable of being detachably connected to one another, where at least some of the display units include at least one detection device for detecting a relative position of at least one further display unit, and the at least one detection device is a sensor which detects at least one adjacent display unit.

7 Claims, 3 Drawing Sheets

SPHERICAL ILLUMINANT AND DISPLAY DEVICE

CROSS-REFERENCE TO RELATED APPLICATIONS

This application is a continuation of International Patent Application No. PCT/EP2018/074660, filed Sep. 12, 2018, which claims the benefit of foreign priority to German Patent Application No. DE 10 2017 121 386.4, filed Sep. 14, 2017, each of which is hereby incorporated by reference in its entirety for all purposes.

BACKGROUND

1. Field of the Invention

The present disclosure relates to a spherical illuminant and a display device with a plurality of such spherical illuminants which allow flexible applications.

2. Related Art

Conventional display devices, or displays, have a rigid matrix of individual display units that typically represent one or more pixels each and can emit light in one or more colors. There are first approaches to a modular design of display devices. For example, it is known from EP 2 357 808 A2 to provide tile-shaped elements as display units, which can be plugged together in various ways to form a complete display device. Since the individual tile-shaped elements are not intended for a specific position in a specific display unit of a certain size, signal exchange is used to determine where each tile-shaped element is located and how it should react to external control commands.

US 2016/267848 A1 discloses a display system comprising a plurality of light emitting units floating in a fluid medium such as water so that each light emitting unit is moveable, each light emitting unit comprising an LED and a communication element for receiving the control data of a control device. An external image capture device is positioned to receive the light from the light emitting elements. Based on the comparison of the received light with the desired image, the individual light emitting elements are controlled accordingly so that brightness and color are modified to display the desired image.

WO 2011/077740 A1 discloses an illumination system consisting of several balloons, wherein the colour of the balloon changes depending on the acceleration, wherein the acceleration is measured by means of an acceleration sensor, wherein the acceleration values are transmitted to a central computer by means of a transmitter unit.

US 2017/0105465 A1 discloses a tie with LEDs arranged in a rectangular matrix form, whereby the individual LEDs are controlled by an integrated microcontroller to create a user-defined light pattern.

SUMMARY

In an aspect, a spherical illuminant includes at least one light source for at least temporarily emitting light in at least one wavelength, at least one drive and/or coupling device for moving the illuminant, a control device for controlling the light source and/or the drive and/or coupling device, and at least one energy storage device and/or an energy source for supplying the control device, the light source and/or the drive and/or coupling device with energy, in particular electrical energy.

At least one receiver may be provided for wireless reception of external signals, the control device being designed to control the light source and/or the drive and/or coupling device as a function of the external signals.

Furthermore, at least one communication device may be provided for wireless data exchange, the control device being designed to control the light source and/or the drive and/or coupling device as a function of at least part of the data.

According to an aspect of the invention, at least one, in particular optical, sensor can also be provided for detecting measured values relating to the spherical illuminant and/or to at least one other, similar, spherical illuminant, the control device being designed to control the light source and/or the drive and/or coupling device as a function of the detected measured values. Preferably at least four, preferably six and further preferably eight, optical sensors are provided.

According to an aspect of the invention, it may also be provided that the drive and/or control device has at least one drive means, in particular comprising an electric motor, for actively moving the illuminant.

Embodiments of the invention are further characterised in that the drive and/or control device comprises at least one, in particular magnetic, coupling means, preferably a plurality of such coupling means, for connecting the spherical illuminant to at least one other, similar, spherical illuminant, wherein preferably each coupling means is designed as a magnetic and/or magnetisable coupling means, in particular comprising at least one coil.

According to an aspect of the invention, it is preferred that the light source, especially in the form of an RGB light source, can emit light in a plurality of colours.

In addition, at least one transmitter may be provided for emitting at least one illuminant signal.

The control device may be programmable or programmed according to an aspect of the invention, in particular to control the light source, the communication device, each sensor, each transmitter and/or the driving and/or coupling device, preferably each driving means and/or each coupling means, in dependence on at least one program.

The spherical illuminant can have a diameter of between 0.09 and 15 mm.

In another aspect, a display device includes a plurality of moveable display units, in particular in the form of spherical illuminants, and at least one external control device for emitting control signals, in dependence on which at least some of the display units form a display, the display units each being of the same size, are of the same shape and/or can be detachably connected via coupling means, preferably at different locations, at least some of the display units comprising at least one detection device for detecting the relative position of at least one further display unit and/or at least one detection device for detecting its own absolute position.

The display units can be detachably connected to one another at different points via coupling means, at least some of the display units comprising at least one detection device for detecting the relative position of at least one further display unit, the at least one detection device being designed as a sensor, preferably as an optical sensor, which detects at least one adjacent display unit.

The spherical illuminants may be able to perform self-organizing processes in the display device to form the display. The display units are caused to perform the self-organizing operation without the introduction of external energy, such as by shaking or vibrating a base on which the display units are in a disordered state, by driving the display units from the external control unit so that the internal control unit in the display elements (for example, spherical illuminants) drives the coupling devices (or coupling means) so that the self-organizing operation is started and performed. The display will then be formed from the majority of the display elements. Because the coupling devices are controllable, they can be switched on and off, allowing the formed display to be released or transformed. Even during the self-organizing process it may be advantageous to release some of the couplings between the display units again, if necessary for a short time, in order to further advance the self-organization.

It is advantageous for the sensor to detect light emitted from a light source of an adjacent display unit.

An aspect of the invention further proposes that the display units each have the same size, are of the same shape and/or are detachably connectable via coupling means, preferably at different locations.

Also at least one external detection device for detecting the position, movement, acceleration and/or emitted light of at least some of the display units per se and/or relative to each other is proposed in order to generate at least one detection signal for the external control device and/or at least some internal control devices of the display units.

It is provided that light sources, driving and/or coupling devices, communication devices, sensors and/or transmitters can be controlled by at least some of the display units as a function of detection signals.

It is also preferable that light sources, drive and/or coupling devices, communication devices, sensors, transmitters and/or coupling means can be controlled by at least some of the display units depending on illuminant signals.

According to an aspect of the invention, the external control device may be integrated into an object that can be worn on a human body.

Finally, at least one base part may be provided on which the spherical illuminants can roll, preferably in trenches, rails and/or recesses.

The display device according to an aspect of the invention may thus include a plurality of display units, each of which has

- at least one light source for emitting light in at least one colour,
- a receiver for wireless reception of signals,
- Coupling means for selectively generating an attractive force between the respective display unit and at least one other display unit, and/or drive means for moving the respective display unit itself or at least one other display unit,
- an internal control device which controls the coupling and/or drive means in dependence on the signals received, and
- an external control device adapted to wirelessly transmit signals to the receiver based on a specification regarding a content of a display to at least a plurality in the plurality of display units.

The display units have all the means to change from a random, disordered state to an ordered one, and this automatically. The resulting order may be entirely determined by the external control device, but it may also be produced by partial self-ordering within the display units in conjunction with the external control signals.

Such a display device can be stored in a compact manner: the individual display units take up relatively little space and can be stored in a box, for example. The box may also have the function of supplying sufficient electrical energy to the display units by inductive coupling of energy into energy storage devices and/or an energy source within the display units so that the light source can be illuminated during the next operation.

In a preferred embodiment of the display device, the display units are capable of rolling, preferably spherical, and the drive and/or coupling means of the display units are designed to cause the respective display unit to roll. This is known from toys for children or pets: An electric motor inside a ball or a ball provides e.g. an imbalance (movement beyond a centre of gravity), so that the ball starts rolling. Preferably, the indicator device according to an aspect of the invention is intended to have the outer shape of balls with a diameter of between 0.09 and 15 mm. Spheres of this size can be used to assemble display units that take up a much larger space than the display units themselves and are very effective. If, for example, a display in DIN A4 format is to be formed from balls with a diameter of 15 mm, 280 balls are required, whereas with a sphere diameter of 0.09 mm, 6.3 million balls are already required, which then also enable excellent image resolution. Very small diameter balls do not include a separate drive device. In this case, the coupling device is the drive unit itself, which is designed to make the display unit roll. Here, for example, the attracting effect of magnetic fields can be exploited by designing the coupling device as a magnetic coil, whereby the appropriate current supply generates specific magnetic fields on the basis of external control signals, which cause the display unit to roll and couple to other display units.

Preferably, the display device according to an aspect of the invention should include the display units of the same size and shape. In this way, the display units can be used anywhere as a display. This is all the more true if they are all capable of emitting light in the same colours (or only one colour at a time, but the same colour everywhere).

While it is basically possible to distribute the display units spaced apart from each other on a base, it is preferably provided that the display units have means for detachable coupling with other display units, i.e. coupling means in the form of small electrical coils, for example, which act magnetically as long as they are energized. In this way, a stable display can be provided.

In the display device according to an aspect of the invention, it is of particular advantage if at least some of the display units comprise at least one detection device for detecting the relative position of at least one further display unit and/or at least one detection device for detecting the own absolute position, and if the internal control device is designed to control the drive and/or coupling means in dependence on the detected position of at least one further display unit and/or the own absolute position. In this way, the display units can avoid getting in each other's way.

While the detection device can basically use any measuring method, such as ultrasound, use of magnetic fields, etc., it is preferably provided that each display unit comprises at least four, more preferably six and especially preferably eight optical sensors as detection devices. The optical sensors do not have to have the complexity of a camera, but very few fields, if not a single one, are sufficient to detect (sense) the light incident on them in their entirety. By suitable distribution of the detection devices over the outer surface of the display units, adjacent display units (balls) can be detected from almost all directions. This is made easier if the display units are designed to light up as soon as one of the display units makes a movement.

In a further preferred embodiment, at least some of the display units each comprise a light source for a plurality of colours. This makes it possible to create attractive and complex patterns with a smaller number of display units than is possible when using display units that emit light in only one colour at a time.

In a further preferred embodiment, it is provided that the external control device is designed to successively control several of the plurality of display units in groups of at least one display unit each, wherein the control of a group takes place when the display unit or the display units of a previously controlled group has or have started or completed a movement. In other words, the external control device can "call up" the display units more or less successively, i.e. successively make them move to a suitable location to provide the desired display.

In principle, it is possible for the external control device itself to be integrated into a display unit which controls the other units as a "primus inter pares", to a certain extent as a display unit of the second type, which controls the other units. Preferably, however, the external control device is not itself a display unit, but an object that can be worn on or integrated into the body of a human being. In this way, the specification for providing a display can take into account gesture control, the absolute position of the wearer in space or in relation to the position of the sun (display device should move in the shade), or relative movements of individual body parts (person leans forward and looks at display device providing a display in the viewing direction below).

The spherical illuminant according to an aspect of the invention is a particularly suitable example of a display unit which can be used with the display device according to an aspect of the invention and it has (in addition to the light source or lamp according to the name) an energy storage device and/or an energy source for electrical energy, possibly an electric motor and an internal control device. The electric motor can cause such movements of an internal mechanical element that the spherical illuminant can be actively moved to another location with predetermined accuracy when the electric motor is operated as specified by the internal control device. However, such a movement is also possible without electric motors through the use of coupling means, passive so to speak. Suitable coupling means are, for example, coils which, when selectively energized, generate specific magnetic fields so that spherical illuminants can be set in motion by magnetic attraction forces to be moved towards each other until the illuminants dock together, as is well known with magnets. Such spherical illuminants can be used in groups to provide a display device, can be stored compactly and can usually be used for a short time due to the energy storage and/or an energy source for electrical energy.

Since in fact the use of activatable coupling means is already sufficient for a illuminant to attract at least one further illuminant via at least one of its coupling means, namely via at least one of its coupling means, a particularly simple construction of the illuminants is possible. In other words, the movement is then caused by targeted activation of individual coupling means, which leads to particularly simple structures in the case of spherical and thus rollable illuminants. In addition, costs, size and weight can be reduced by omitting drive equipment.

Preferably, the spherical illuminant has a receiver for wireless reception of external signals (WLAN, Bluetooth or the like), wherein the internal control device is designed to control the electric motor as a function of at least the external signals. Thus, interaction with an external control device such as that provided by the indicator device according to an aspect of the invention is possible and preferred. Alternatively or additionally a plurality of sensors, preferably optical sensors, may be provided for detecting measured values to other similar spherical illuminants, and the internal control device may be designed to control electric motors and/or coils in dependence on at least the detected measured values. Such spherical illuminants are capable of performing self-organizing processes in a display device.

The display device according to an aspect of the invention enables different methods of providing a display. Two such procedures are described below as examples.

A first procedure has the following steps:

Receiving by a main control device a specification for the object of a display,

Transmitting at least one control signal to secondary control devices integrated in display units which can move themselves, Receiving the at least one control signal by at least one of the display units, automatic movement of at least a first display unit which has received the control signal, in dependence on the control signal, detecting the movement or the relative or absolute position of the at least one first display unit by at least one second display unit different from the at least one first display unit, automatically moving the at least one second display unit in dependence on the movement or achieved position of the at least one first display unit and/or on the (current) movement or current position of the at least one second display unit, and Emitting light through at least part of the display units to provide the display according to the specification.

A second method has, for example, the following steps for rollable, preferably spherical display units:

Receiving by a main control device a specification for the object of a display,

Transmitting at least one control signal to secondary control devices integrated in display units having activatable coupling means, Receiving of the at least one control signal by at least one of the display units, Activating at least one of the coupling means of at least one first display unit which has received the control signal to act on at least one coupling means of at least one second display unit, so that the first display unit exerts an attractive force on the second display unit, Detecting the (rolling) movement or the relative or absolute position of the at least one first and/or second display unit, in order to ensure that activated coupling means of the activated display units are touched, if necessary, by adapted control signals, and Emitting light through at least part of the actuated display units, in particular after reaching the desired end position, to provide the display according to the specification.

In both of the methods described above, it may be provided that the emission of light by at least some of the display units is dependent on the achieved position of the at least one first display unit and/or the at least one second display unit; and/or in that the main control device controls the plurality of auxiliary control devices in groups of at least one auxiliary control device each, wherein the control of a group is effected when the display unit or display units associated with the respective auxiliary control device or the respective auxiliary control devices of a previously controlled group has/have started or completed a movement; and/or in that the control signals of the main control device specify a position only for at most some of the display units and the assumption of the position by the other display units is self-organising.

In general, the specification for the pattern to be displayed can be selected from a finite number of patterns, so that the pattern can be recognized by the other display units based on the position occupied by the first display units (if data is stored in an internal data memory for this purpose). The external control device (main control device) can receive such inputs via associated input means, or it may be coupled to devices such as measuring sensors, for example in a motor vehicle with a speedometer if the display is used to display the speed, or to a navigation device which knows or detects speed restrictions and if numerical values are to be displayed for this purpose.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
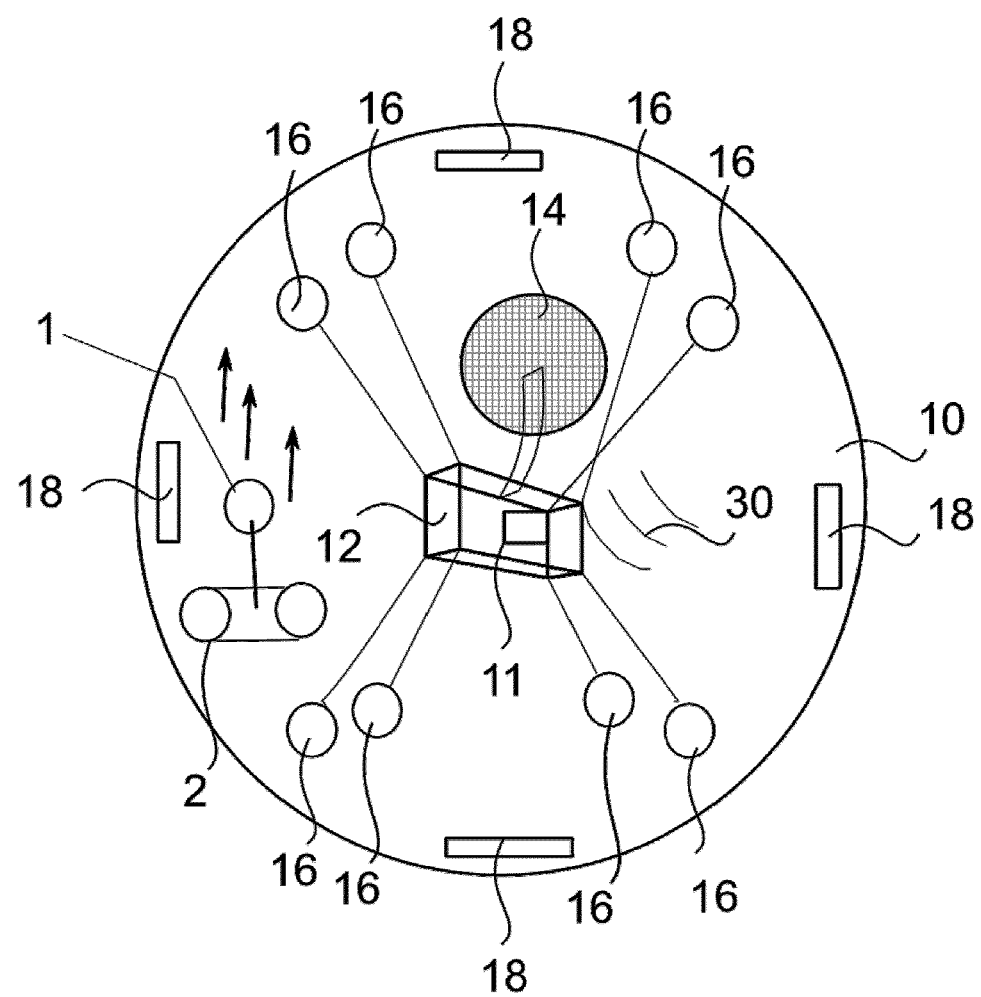
FIG. 1 is a schematic representation of a spherical illuminant according to the invention.

A display unit in the form of a spherical illuminant shown in FIG. 1 and designated 10 in its entirety naturally comprises a illuminant 1 as its core, which is supplied with electrical energy from an energy storage device 2 for electrical energy. The display unit 10 has an internal control device 12 which is coupled to a receiver 11 for wirelessly transmitted signals and is capable of driving an electric motor 14 (shown only schematically) which, in a manner known per se, can set the ball, in this case the display unit 10 as a whole, in motion and, if necessary, also bring it to a specific stop by electromagnetic driving of a (not shown) mechanical element outside the centre of gravity of the ball.

Since it is intended that a plurality of similar spherical illuminants 10 interact with each other, each sphere has a plurality (eight are shown as an example) of optical sensors 16, which are evenly distributed over the outer surface of the sphere, i.e. ideally cover all directions. The optical sensors 16 can be designed as a complex camera, but also simply as a light-sensitive element that can detect light emitted by a lamp 1 of a similar display unit. In order that several display units can form a compound with each other, magnetic coupling means 18 are provided, which are excited by electric current from the energy storage and/or an energy source 2 (for example magnetic coils).

In order to present an advertisement, a number of spherical illuminants 10 as shown in FIG. 1 must be positioned relative to each other in a certain way. Essential for this is, balls can organize themselves, so it is known which ball belongs where.

First of all, it must be determined what is to be displayed. As soon as an appropriate selection has been made, the necessary arrangement of the balls and their respective functions are determined in a corresponding matrix. This can be done in a similar way to creating milling strategies in the CNC.

For the matrix, an algorithm determines a starting point that calculates the optimal starting point of the display to be presented. Then the corresponding information is broken down into fragments. Not every ball needs all the information. Few relations to neighboring sphere—3 or more—are enough. The individual data fragments are given to the "ball chain" one after the other, so that the display can expand bit by bit.

The procedure explained below on the basis of FIGS. 2 to 5 is exemplary and concerns the display of the number "7" by means of a display device according to an aspect of the invention.

As also schematically indicated in FIG. 1, the internal control device 12 of each display unit 10 is capable of receiving and evaluating radio signals 30 (or infrared, ultraviolet and similar signals) emitted by an external control device 20 and taking them into account when controlling its electric motor 14.

First of all, the external control unit 20 will give a specification as to where the corner of the mould is to be found in the number '7', which acts as the starting point. Here, it can be taken into account in which direction a user is looking (for example, using eye-tracking methods). The display unit selected for the corner is, in this case, display unit 10a, which, for example, starts to light up when the control signal is received or when it reaches its end position. Two further display units 10b and 10c also receive the control signals 30 and detect that they must orient themselves in a certain way to the display unit 10a, in particular its position, and must assume a certain relative position in relation to it. The control signals may be generated inherently by the external control device 20 or in a self-organising process by software running in the internal control device 12. It is also not excluded that the control devices are also coupled with (not shown) transmitting devices that can send signals to other display units 10.

Figure 2:
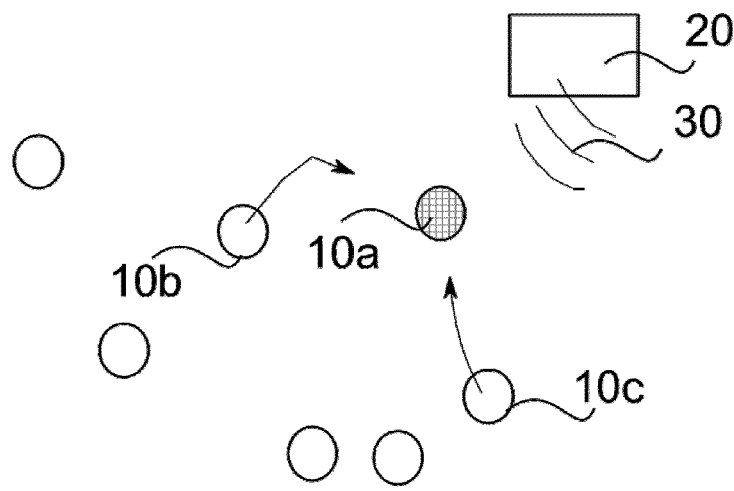
FIGS. 2, 3, 4, and 5 illustrate how a plurality of illuminants of FIG. 1 form a display device according to the invention.
Figure 3:
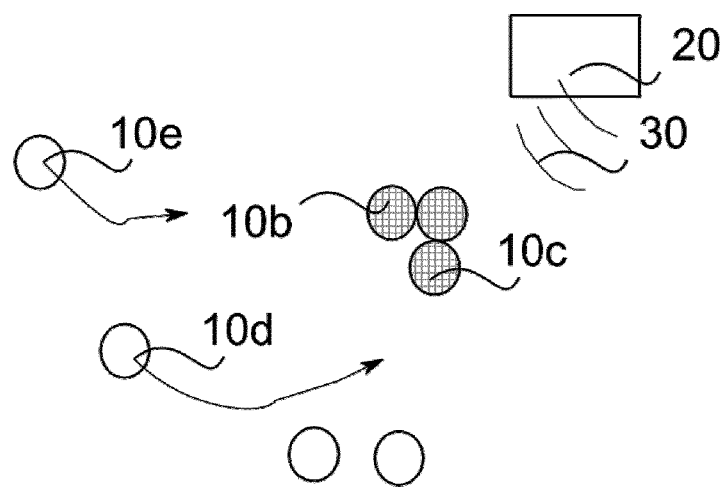
Figure 4:
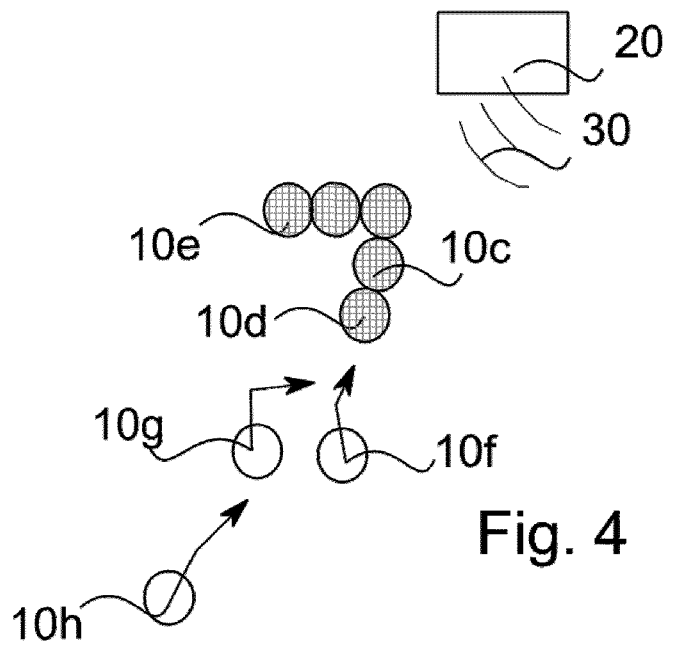
Figure 5:
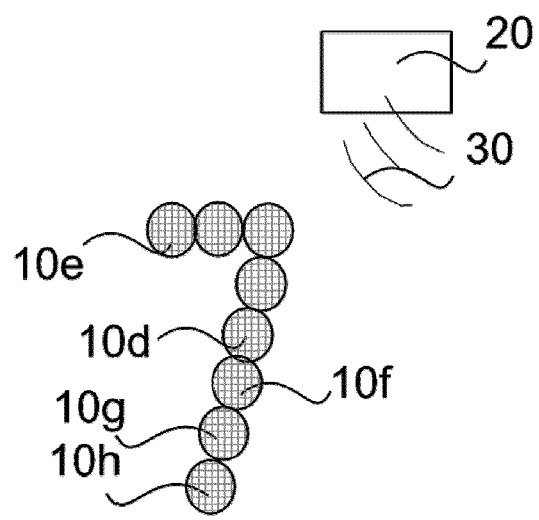

The display units 10b and 10c, shown in FIG. 2 in their initial position, approach the display unit 10a, connect to it by means 18 and reach the configuration shown in FIG. 3. At the same time, the external control unit 20 sends control signals to the other display units 10d and 10e, which in turn cause them to approach the display units 10c and 10b to form the "7". When the configuration shown in FIG. 4 is reached, three display units 10f, 10g and 10h receive corresponding control signals and together form the long leg of the "7" to reach the final configuration according to FIG. 5, in which all display units also light up.

In the example case, the display units themselves are equipped with similar illuminants 1 and shine in one color, for example white (which is considered a color here). Other designs are possible, in which display units form the shape of a closed matrix and partly do not light up or light up in a background colour.

The description so far assumes that the spherical illuminants roll as display units 10 on a flat surface. However, the display device may also include a specific shaped base of a base part not shown, such as a floor with trenches in the shape of an angular "8", in order to display numbers in the manner of a digital display, by means of display units rolling along the trenches.

It is also possible that the display units are protected by a cover. In this context it is not necessarily the case that the display units move horizontally. On the contrary, if the indicator is tilted, a force can be exerted against the force of gravity. In addition to the electric motor 14, magnetic elements may also be provided, which may also interact with structures in the base and/or lid. For example, it is possible to magnetize ferromagnetic threads in a glass lid to hold the display units in certain positions when the display is not flat.

The invention can be used in motor vehicles precisely in an embodiment corresponding to that last described. Advantageously, in combination with eye-tracking, a display such as a number, a speed indicator number, a warning symbol or the like can be shown to the driver in his field of vision. The energy storage device 2 for electrical energy can be provided in the form of a battery which can be inserted into the spherical illuminants as display units 10, but inductive coupling of electrical energy (charging) may also be possible. Charging can also take place (partially) while moving on a given surface, for example with changing magnetic fields.

The invention as a whole provides a flexible way in which a display device can be equipped with a few elements which are cleverly arranged in the desired arrangement.

Although there is a display described, since the display units are three-dimensional, preferably in the form of spheres, and can be coupled together at different points, essentially any three-dimensional structure can be formed from the display units. In other words, the term "display" should also include a three-dimensional structure that is displayed.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS

1 Lamp
2 Energy Storage
10, 10a, 10b, 10c, 10d, 10e, 10f, 10g, 10h Display unit
11 Receiver
12 Internal control device (as an auxiliary control device)
14 electric motor
16 optical sensors
18 magnetic coupling means
20 external control device (as main control device)
30 Control signal

What is claimed is:

1. A display device, comprising:
a plurality of moveable display units; and
at least one external control device for emitting control signals in dependence on which at least some of the plurality of display units form a display, the display units each being connected at different locations via coupling means and capable of being detachably connected to one another,
wherein at least some of the display units comprise at least one detection device for detecting a relative position of at least one further display unit, and
wherein the at least one detection device is a sensor which detects at least one adjacent display unit,
wherein the moveable display units are spherical illuminants comprising one or more of at least one energy storage device or an energy source for supplying one or more of the at least one external control device, the light source, the drive, and the coupling device with electrical energy,
wherein each of the plurality of moveable display units comprises an electric motor which is configured to set each of the plurality of moveable display units in motion and bring the plurality of moveable display units to a specific stop by electromagnetic driving of a mechanical actuator outside the center of gravity of each of the plurality of moveable display units, and
wherein the at least one external control device is integrated into at least one of the plurality of moveable display units so that the at least one of the plurality of moveable display units controls all of the plurality of moveable display units.

2. The display device of claim 1, wherein the sensor detects a light emitted by a light source of an adjacent display unit of the plurality of display units.

3. The display device of claim 1, wherein the control signals can be received as external signals from the plurality of display units.

4. The display device of claim 1, further comprising at least one detection device for detecting at least one of a position, a movement, an acceleration, and an emitted light of at least some of the display units of the plurality of display units themselves or relative to one another in order to generate at least one detection signal for the external control device.

5. The display device of claim 1, wherein one or more of light sources, drive or coupling devices, communication devices, sensors, and transmitters can be controlled by at least some of the display units of the plurality of display units as a function of detection signals.

6. The display device of claim 1, wherein one or more of light sources, drive or coupling devices, communication devices, sensors, and transmitters can be controlled by at least some of the display units of the plurality of display units as a function of illuminant signals.

7. The display device of claim 1, wherein the external control device is integrated into an object that can be worn on a body of a human being.

\* \* \* \* \*